United States Patent [19]
Deckas et al.

[11] 4,344,784

[45] Aug. 17, 1982

[54] FILTER ASSEMBLY FOR CLEAN AIR ROOMS AND WORK STATIONS

[75] Inventors: Peter C. Deckas, Edina; James A. Cooper, New Hope; James V. Leebens, Jr., Minneapolis, all of Minn.

[73] Assignee: Dexon, Inc., Minneapolis, Minn.

[21] Appl. No.: 238,769

[22] Filed: Feb. 27, 1981

[51] Int. Cl.³ .................... B01D 46/10; B24F 3/16
[52] U.S. Cl. .................... 55/473; 55/385 A; 55/483; 55/484; 55/502; 55/DIG. 31; 55/DIG. 18; 98/40 D
[58] Field of Search ........... 55/385 A, 480, 483, 55/484, 501, 502, 511, DIG. 29, DIG. 31, 478, DIG. 18, 473; 98/40 D; 52/475, 652, 656

[56] References Cited

U.S. PATENT DOCUMENTS

| | | | |
|---|---|---|---|
| 2,792,906 | 5/1957 | Evans | 55/DIG. 31 |
| 2,992,702 | 7/1961 | Reid | 55/DIG. 31 |
| 3,158,457 | 11/1964 | Whitfield | 55/472 |
| 3,318,076 | 5/1967 | Baker | 55/350 |
| 3,323,437 | 6/1967 | Knab | 55/385 A |
| 3,347,025 | 10/1967 | Wiley | 55/473 |
| 3,375,640 | 4/1968 | Pelosi, Jr. | 55/276 |
| 3,418,915 | 12/1968 | Marble | 98/40 D |
| 3,470,679 | 10/1969 | Ramsey | 55/473 |
| 3,494,112 | 2/1970 | Deckas | 55/470 |
| 3,513,643 | 5/1970 | Tarala | 55/473 |
| 3,616,624 | 11/1971 | Marsh | 55/472 |
| 3,703,801 | 11/1972 | Deckas | 55/473 |
| 3,729,905 | 5/1973 | Diccanni | 55/473 |
| 3,802,163 | 4/1974 | Deckas | 55/473 |
| 3,880,625 | 4/1975 | Shook | 55/473 |
| 3,986,850 | 10/1976 | Wilcox | 55/473 |
| 4,098,174 | 7/1978 | Landy | 55/473 |
| 4,178,159 | 12/1979 | Fecteau | 55/385 A |
| 4,191,543 | 3/1980 | Peters | 55/385 A |
| 4,217,121 | 8/1980 | Fichter | 55/501 |
| 4,233,044 | 11/1980 | Allan | 55/DIG. 31 |

*Primary Examiner*—David L. Lacey
*Attorney, Agent, or Firm*—Dorsey & Whitney

[57] ABSTRACT

A filter assembly for clean air installations includes a block of high efficiency particulate air (HEPA) filter material adhesively bonded and sealed within an imperforate rigid thin-walled side frame which extends axially beyond the inlet surface of the filter block and thus provides an integral plenum chamber volume as part of a self-contained filter subassembly. The side frame has peripheral cover and supporting flanges at its inlet and outlet ends and can thus be conveniently assembled with and removed from a reusable cover member and cover gasket for the plenum chamber and a reusable perforated outlet grill and one or more peripheral outlet sealing gaskets, all of which constitute parts of a complete filter assembly which can be readily supported by a standard or special ceiling or wall grid or frame assembly.

12 Claims, 5 Drawing Figures

FILTER ASSEMBLY FOR CLEAN AIR ROOMS AND WORK STATIONS

BACKGROUND OF THE INVENTION

This invention relates to filter assemblies for use in supplying extremely clean air to rooms and work stations where operations are being conducted on materials or in connection with processes for which the introduction of any extraneous particles or impurities must be carefully avoided.

Such clean air installations sometimes involve the provision of a clean air supply for an entire clean air room. In other cases, it may be necessary only to provide a clean air supply at a particular bench or work station, within a room for which a normal air supply is otherwise used.

Some prior clean air work stations and a room air cleaner are shown, for example, in U.S. Pat. Nos. 3,494,112; 3,703,801; and 3,802,168; assigned to the same assignee as the present invention. Other clean room arrangements and filter assemblies are shown in U.S. Pat. Nos. 3,158,457; 3,418,915; and 4,178,159. Details of other prior work station arrangements and of filter elements and assemblies are also shown in U.S. Pat. Nos. 3,318,076; 3,470,679; 3,616,624; and 3,729,905.

Prior filter units for such installations have involved various problems, such as the blocking of some of the possible filter area by the necessity of providing clamping mechanisms to hold such filters removably in place, and by problems of securing a perfect gasket or other seal all around a filter unit to avoid the bypassing of undesired particles around the filter from a structurally separate pressurized plenum chamber with which such prior filters have been removably connected. Prior filter units in which the filter material is clamped mechanically inside a thick frame of wood or other flammable material may also present unacceptable fire hazards in connection with installations.

Thus, applicants have perceived a need for an improved filter assembly as described and claimed in this application.

SUMMARY OF THE INVENTION

The present invention provides a filter assembly for a clean air installation in which a block of high efficiency particulate air filter material having axially spaced inlet and outlet surfaces and an outer peripheral side surface extending all around the block between the inlet and outlet surfaces is adhesively bonded within an imperforate, rigid, thin-walled side frame portion which surrounds and closely fits the peripheral side surface of the filter block, and in which the side frame portion has open inlet and outlet ends spaced axially from each other a distance substantially greater than the distance between the inlet and outlet surfaces of the filter block. The outlet surface of the filter block is positioned in essentially the same plane as the side frame outlet opening. The side frame inlet opening is thus spaced axially upstream from the filter block inlet surface, thereby enclosing the sides of a plenum chamber volume which is provided as an integral or self-contained portion of the filter assembly immediately upstream of the filter block. Such a filter assembly provides a maximum cross-sectional filter area within a given available outside dimension for the supporting frame and thus facilitates the use of a plurality of such filter assemblies in side-by-side relation to each other in either the ceiling grid or corresponding sidewall openings of a clean air room or in appropriate boundary walls of an individual clean air work station. The assembly includes its own bonded seal between the filter block and plenum chamber edges, so that the filter assembly can use non-critical, low-pressure seals between the filter assembly and its ultimate ceiling or wall support members.

In a preferred embodiment of the invention, the supporting side frame portion is provided with a peripheral supporting flange projecting laterally outwardly around and in substantially the same plane as the filter block outlet surface. A perforated outlet grill extends across the entire filter block outlet surface and overlaps at least a portion of the peripheral supporting flange outside the filter block outlet surface, and the supporting flange and outlet grill are shaped and dimensioned to fit upon or against the normal longitudinal and lateral bars of a standard or special ceiling or wall panel supporting grid. To seal the filter assembly in such an installation, the preferred filter assembly also has at least one peripheral sealing gasket adapted to fit around the outside of the filter block outlet surface (without blocking or reducing its effective area) on the downstream side of the outlet grill and of the peripheral side frame supporting flange. Thus, such a gasket effectively seals the space between the filter assembly and the supporting bars which define and form the panel-supporting ceiling or wall grid.

Another feature of the preferred embodiment of the invention involves the provision of a peripheral cover flange projecting laterally outwardly from the side frame portion in substantially the same plane as the side frame inlet opening, with a plenum chamber inlet cover member extending across and covering the side frame inlet opening and the plenum chamber volume, the cover member being removably secured in air-tight relation to the peripheral cover flange and having an air inlet opening therein of substantially smaller cross-section area than the side frame inlet opening for delivering pressurized air through such air inlet into the plenum chamber volume and through the filter block.

A self-contained blower unit may be mounted directly on the inlet cover portion for selective removal of the entire filter assembly and blower unit from the supporting bars of a ceiling or wall grid in a clean air room or at a clean air work station. The inlet cover and blower can be removed from a used filter and side frame subassembly and reused by attachment to a fresh filter subassembly in combination with the original grill and with the original or fresh peripheral sealing gasket or gaskets.

Other features and details of the invention will be apparent from the following specific description of the preferred embodiments.

BRIEF DESCRIPTION OF THE DRAWINGS

In the drawings which form a part of this application, and in which like reference characters indicate like parts.

DESCRIPTION OF THE PREFERRED EMBODIMENTS

Figure 1:
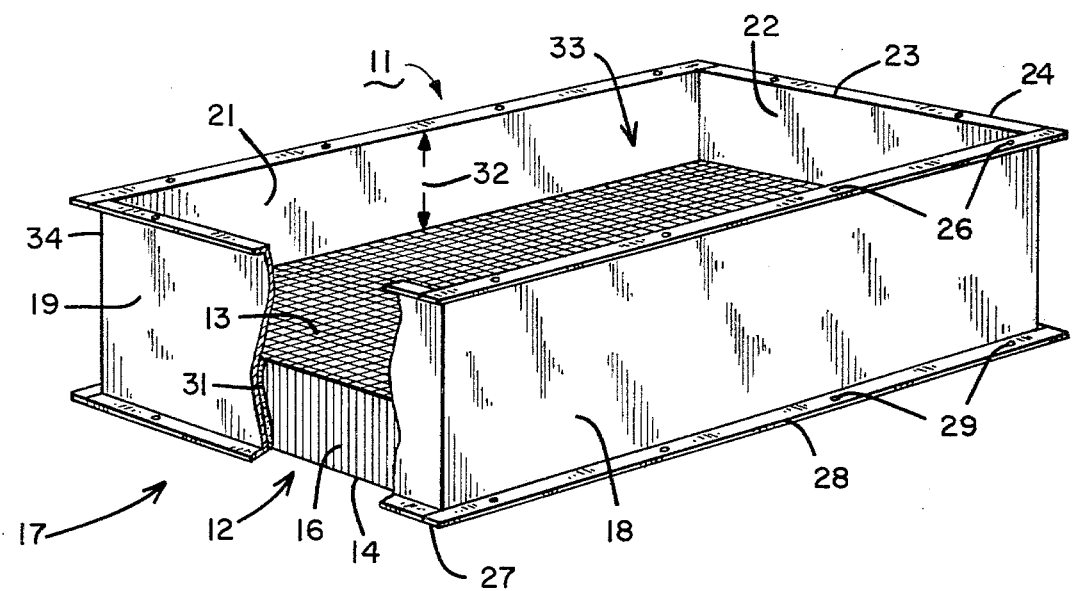
FIG. 1 is a perspective view, with portions broken away, showing the combination of a block of filter material and a surrounding side frame supporting portion according to the present invention.

As shown in FIG. 1, the present invention involves a filter assembly 11 which includes a block 12 of high efficiency particulate air filter material, sometimes referred to as a HEPA filter. The block of material has axially (in this case vertically) spaced inlet and outlet surfaces 13 and 14 respectively, which are essentially parallel to each other and through which a current of air is to be passed from surface 13 and out through surface 14 to remove undesired particles from such air.

The block 12 of filter material has an outer peripheral side surface 16, which extends all around the block between the outer edges of the inlet and outlet surfaces.

The filter 12 is supported by a supporting frame 17 which has a side frame portion comprising imperforate, rigid, thin side walls 18, 19, 21 and 22 extending all around the block 12 of filter material, so that it surrounds and closely fits the entire peripheral side surface 16 of the filter block. This said frame portion has an open inlet end 23 defining a side frame inlet opening of essentially the same cross-sectional shape and area as the inlet surface 13 of the filter block 12. Around the inlet open end 23, the side frame portion is provided with a peripheral cover flange 24 projecting laterally outwardly from the walls of the side frame portion in substantially the same plane as the inlet opening 23. The peripheral cover flange has suitable open end 26 to receive fastening members for a cover and gasket hereinafter described.

Similarly, the side frame portion has an open outlet end 27 defining a side frame outlet opening of the same cross-sectional shape and area as the outlet surface 14 of the filter block 12. The side frame portion also has a peripheral supporting flange 28 projecting laterally outwardly around and in substantially the same plane as the filter block outlet surface. This supporting flange is provided with openings 29 for securing the filter assembly to a suitable support, such as the supporting bars of a standard ceiling or wall panel supporting grid or frame. The outer edges 30 of flange 28 are preferably shaped and dimensioned to just fit within such a standard grid or frame as in FIG. 4 or within a special T-bar support grid as in FIG. 5.

As shown in FIG. 1, the open inlet and outlet ends 23 and 27 of the side frame portion are spaced axially from each other a distance substantially greater than the axial distance between the inlet and outlet surfaces 13 and 14 of the filter block 12. The outer peripheral side surface of the filter block is adhesively bonded by a layer 31 of suitable adhesive to the inner surface of the side frame walls 18, 19, 21 and 23, with the outlet surface 14 of the filter block in essentially the same plane as the side frame outlet open end 27 and peripheral supporting flange 28. Thus, the inlet open end 23 of the side frame and the peripheral cover flange 24 are spaced axially upstream from the filter block inlet surface 13 by the distance indicated by the two-headed arrow 32 in FIG. 1, thereby providing a plenum chamber volume or air space 33 throughout the region immediately upstream from the filter block inlet surface 13. The necessary plenum chamber volume is thus provided as an integral or self-contained portion of the filter block and supporting frame subassembly, which eliminates the problem of sealing an ordinary filter subassembly as a separate element within or in fluid communication with a structurally separate plenum chamber.

Adhesive 31 can be a known metal to media (e.g., filter material) resilient adhesive. Such adhesives have been used specifically with HEPA filter material. For the purposes of this invention, an adhesive should be selected which remains pliable and is not subject to substantial hardening with age or normal working room temperatures. One such commercially available adhesive is sold by 3M Co. under its specification 3M 1313. Adhesive layer 31 provides an integral seal or bond as part of the subassembly of FIG. 1 to prevent leakage of contaminated air from the plenum chamber around the filter block.

Figure 2:
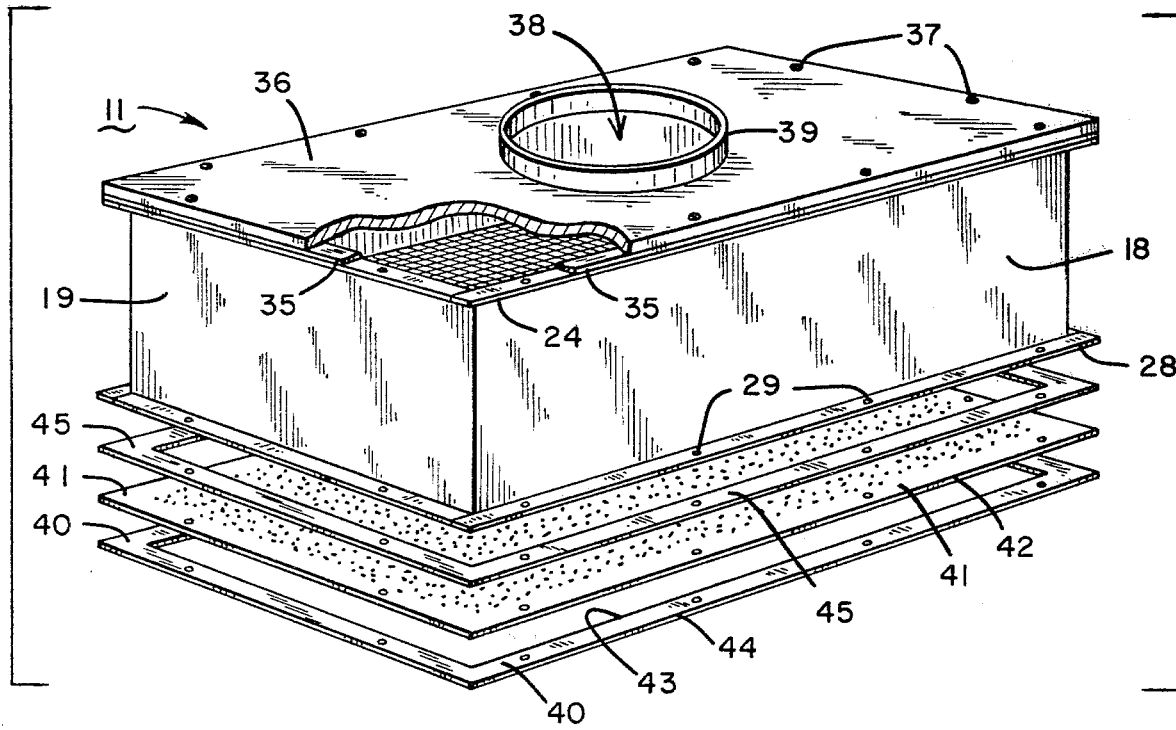
FIG. 2 is an exploded view within brackets and with portions broken away, showing the device of FIG. 1 with a plenum chamber inlet gasket and cover secured thereon and with an outlet grill and sealing gaskets positioned below the supporting frame and filter block ready for assembly at the outlet opening of the side frame portion.

As shown in FIG. 2, the filter assembly is provided with a cover edge gasket 35 which fits the top surface of flange 24, and a plenum chamber inlet cover portion 36 which extends across the side frame inlet opening and overlaps and is secured to the gasket 35 and cover flange 24 by screws or other securing members 37 engaging the openings 26 in flange 24. Cover portion 36 has an air inlet opening 38, which may be defined by a projecting circular flange 39 adapted to fit the delivery conduit of a blower unit or air supply pipe. Inlet opening 38 is of much smaller cross-section area than the open inlet end of the supporting said frame portion. Cover 36 thus essentially closes the top of the plenum chamber volume 33 of FIG. 1.

Figure 3:
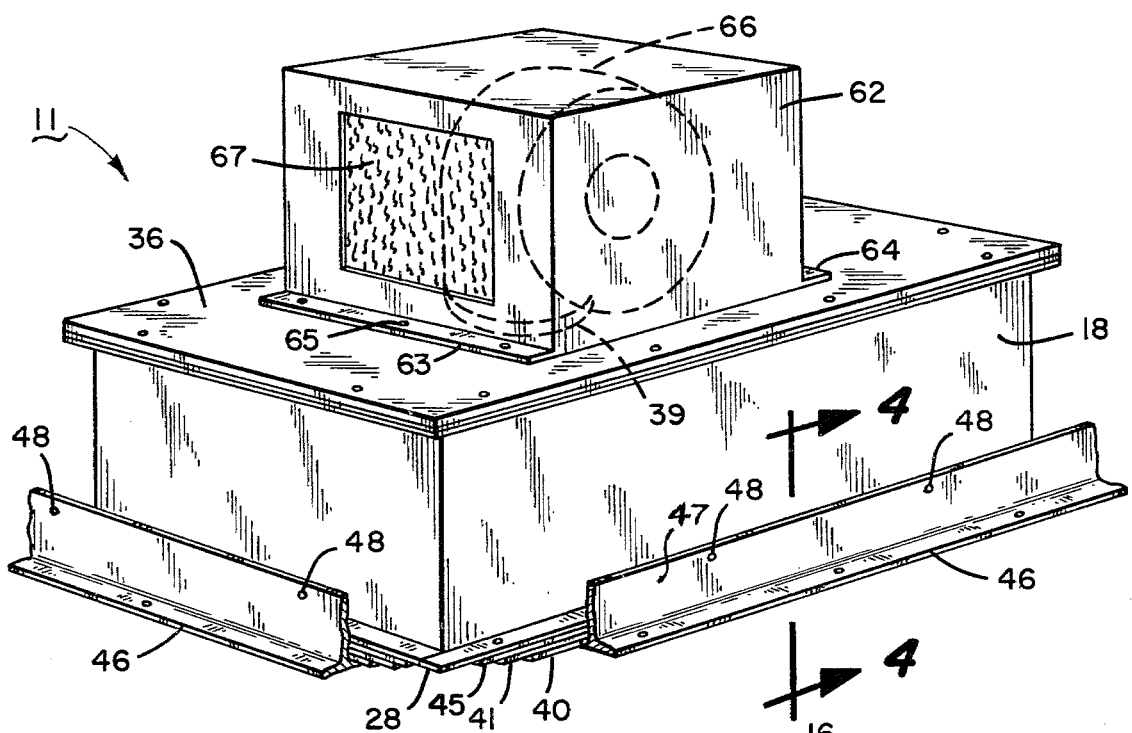
FIG. 3 is a perspective view of the device of FIGS. 1 and 2 positioned on the standard T-bar support members of a ceiling grid and with a self-contained blower unit mounted directly on the inlet cover portion of the assembly.
Figure 4:
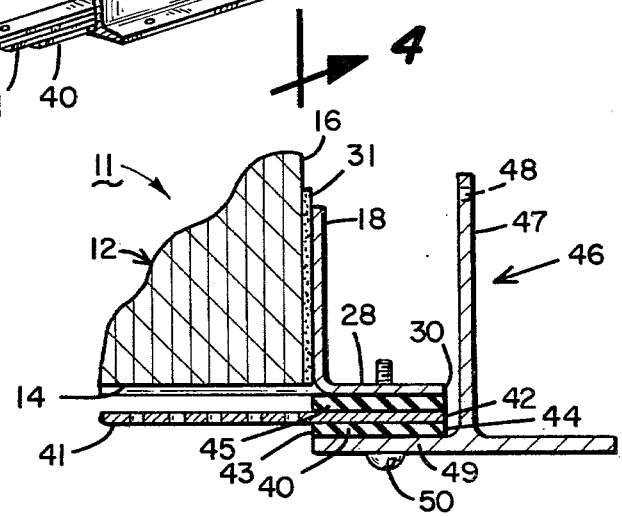
FIG. 4 is a partial section view on the line 4—4 of FIG. 3 showing details of the mounting of the filter assembly of FIG. 3 and its outlet grill and sealing gaskets on the horizontal supporting surface of a standard T-bar support of a ceiling grid.

As further shown in FIG. 2, a perforated outlet grill 41 can then fit across the open outlet end of the supporting side frame portion and the outlet surface 14 of the filter block 12. The imperforate peripheral edges 42 of grill 41 are dimensioned and shaped to overlap at least the inner portion of the peripheral flange 28 when the assembly is mounted on a suitable supporting frame, such as a ceiling or wall grid or frame. In FIGS. 2, 3 and 4, the imperforate grill edges 42 are shown as coextensive with flange 28, i.e., extending all the way out to the outer edges 30 of flange 28, whereas grill edges 42 can be spaced somewhat inwardly of flange edges 30 when used in one of the modified embodiments shown in FIG. 5.

At least one peripheral outlet gasket is provided to fit between the ceiling or wall frame and the elements of the filter assembly. Thus in FIGS. 2, 3 and 4, a peripheral sealing gasket 40 is adapted to extend all around outlet open end 27 below the overlapping surfaces of the peripheral flange 28 and grill 41. The inner edge 43 of gasket 40 defines a central opening which is at least as large in area as the outlet surface 14 of the filter block, so that the gasket does not block part of the filter area of surface 14 or the openings of the grill which are co-extensive with the filter area. In the embodiment of FIGS. 2-4, the inner edge 43 of the sealing gasket 40 has the same dimension as the inner surface of the side frame side walls 18, 19, 21 and 22. The outer edge 44 of the sealing gasket 40 is adapted to extend to a line below the outer edge 30 of the peripheral supporting flange 28 of the side frame.

In the embodiment of FIGS. 2, 3 and 4, a second peripheral outlet sealing gasket 45 is assembled between the overlapping surfaces of the peripheral support flange 28 and the outer edges 42 of grill 41. Gasket 45 has the same shape and dimensions as gasket 40 and provides a light seal between flange 28 and the upper edge surface of grill 41.

Thus the parts can be assembled and supported, as shown in FIGS. 3 and 4, on the standard longitudinal and lateral T-bar supporting members of a regular ceiling grid, in place of one or more of the normal ceiling panels supported on such a grid. A standard inverted T-bar support of this type is shown at 46. It has a central strip portion 47 extending vertically and longitudinally of the bar. Openings 48 in vertical strip 47 are used for suspension of the T-bar at a desired distance below a room ceiling or joist. Such a support has horizontal or laterally projecting surfaces 49, on which ceiling panels are normally to be supported.

The filter assembly 11 of the present invention is adapted to fit such T-bar supports in place of one of the ceiling panels, with the parts in the relative positions of FIG. 4. Here the first or lower peripheral outlet sealing gasket 40 is positioned below grill 41 and rests on the top of the supporting surface 49 of the T-bar. The frame supporting flange 28 rests on the upper outlet sealing gasket 45, which seals the edge space between flange 28 and the upper surface of outer edge portions 42 of grill 41. In this embodiment, the outer peripheral dimensions of the filter assembly support flange, grill and gasket edges are just under 48×24 inches, e.g., 47.62×23.62 inches.

The construction of the filter assembly 11 is such that the filter assembly can be supported in the position of FIG. 4 by its own weight alone, without any special fastening or clamping means to hold the assembly against the top of T-bar flange 49. The filtered air which is forced downwardly through filter block 12 and its outlet surface 14 is not at a particularly high outlet pressure and can readily pass through the openings of grill 41 without leaking outwardly between flange 28 and support 49. In the other direction, the general air space above flange 28 and above the entire filter assembly 11 is not highly pressurized, in view of the delivery of pressurized air only to the air inlet 38 in the cover member 36 of the assembly. Thus there is no high pressure volume above flange 28 around the outside of filter assembly 11 which would tend to force air inwardly between peripheral flange 28 and the T-bar flange 49, where it could enter the clean room or clean work station to which filter assembly 11 is supplying its filtered air supply. Fastening screws or bolts 50, however, may be provided as shown in FIG. 4 as an additional precaution to prevent accidental displacement of the filter assembly, and the outlet gasket members 40 and 45 can be compressed sufficiently, either by screws 50 or by the weight of the assembly, to accomodate to any irregularities in the peripheral flange 28 of the filter assembly or the grill edges or the lateral supporting surface 49 of the T-bar support. Imperforate grill edge areas 42 and gaskets 40 and 45 may have preformed fastening holes corresponding to screw openings 26 in flange 28 for axial alignment to receive such screws.

Figure 5:
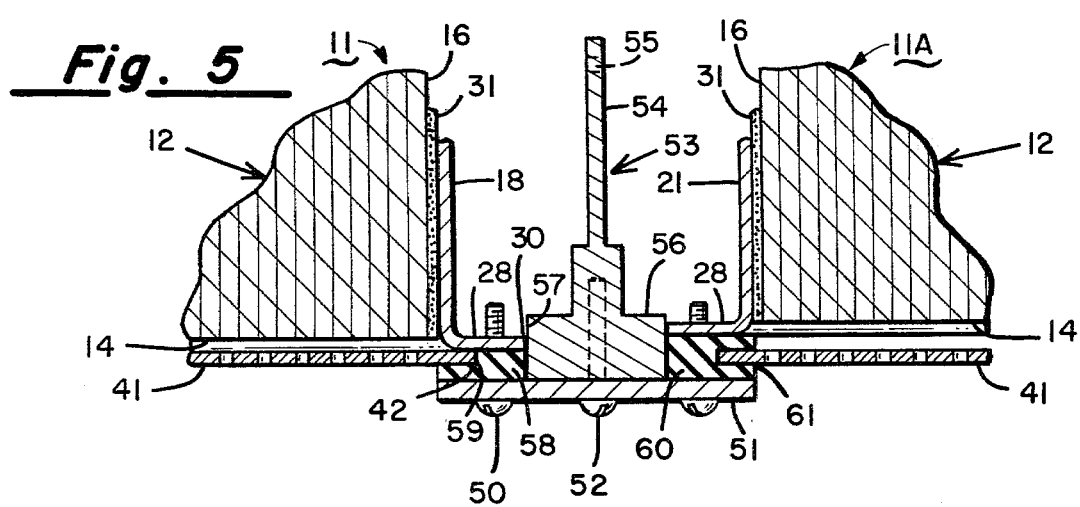
FIG. 5 is a view similar to FIG. 4 showing a modified T-bar support adapted for downward removal of the filter assembly from the ceiling for repair or replacement, and also showing modified outlet sealing gaskets, as well as the manner in which an additional filter assembly of the same type may be supported on the opposite flange of the same or a standard T-bar support without blocking the effective filter area and with minimum non-filtering space between the adjacent units.

FIG. 5 shows a modified supporting arrangement which is primarily designed to permit downward removal of filter assembly 11 from the special T-bar supports shown in FIG. 5 for a ceiling grid arrangement, whenever such removal is desired for repair or replacement.

In this case, the filter assembly 11 is secured in light sealing engagement on the upper surface of a longitudinal supporting plate 51 which is a downwardly removable part of a special T-bar longitudinal grid member 53 for the desired ceiling grid installation. Longitudinal plate 51 is removably secured by fastening bolts 52 to the bottom of a vertically and longitudinally extending strip portion 54 of special T-bar 53. The longitudinally extending vertical strip or extrusion 54 is provided with openings 55 for suspending the bar the desired distance below the actual ceiling or joists at the top of a room. Strip 54 has short laterally projecting portions 56 as shown in FIG. 5 with vertical edges 57 against which the outer edges of the filter assembly are adapted to fit.

In the embodiment of FIG. 5, two modified grill edge and gasket arrangements are shown. In the filter assembly 11 at the left of FIG. 5, the outer edges of grill 41 overlap only the inner portion of flange 28, with no gasket between them. A single outlet sealing gasket 58 is then positioned under these overlapping grill and flange portions. Gasket 58 has the same shape and peripheral dimensions as gaskets 40 and 43 of FIG. 4. Thus the peripheral supporting flange 28 and the sealing gasket 58 are adapted to fit upon and be supported either by removable plate 51 of FIG. 5, or by the usual longitudinal and lateral bars of a standard ceiling panel supporting grid as in FIG. 4, or by the equivalent thereof in a vertical wall.

If desired, the gasket 58 can also be provided with a stepped portion at 59 corresponding to the thickness of the grill edge, as shown at the left of FIG. 5. Alternatively, the gasket 58 may omit such a stepped portion, but be sufficiently resilient and compressible to adapt itself to the difference in levels at this point when the filter assembly is mounted on its ultimate support. To secure the filter unit firmly in position and to ensure a light but positive seal all around the edges of the unit, screws or bolts 50 are threaded through the supporting plate portion 51 and the sealing gasket 58 and into the openings 29 in peripheral supporting flange 28.

FIG. 5 shows a similar filter unit 11A secured to and supported by the plate 51 on the opposite edge of the special T-bar grid member 53 from unit 11. Additional filter assembly units could also be positioned in other adjacent rectangular areas of a ceiling or wall grid system, depending on the total volume of clean filtered air which is needed for the particular room or work station.

In the embodiment shown at 11A in FIG. 5, another modification of the peripheral outlet sealing gasket is shown. The body of gasket 60 has a peripheral shape and size essentially identical to gaskets 40, 45 and 58, except that its inner edge has a groove 61 to receive the outer edges of grill 41. Such edges extend under only the inner portions of flange 28. Thus, the portions of gasket 60 above and below groove 61 seal the spaces above and below the grill edge, similar to the separate gaskets 45 and 40 of FIG. 4.

Instead of the modified grill edge and gasket arrangements shown at 58 and 60 in FIG. 5, it is possible and in some cases may be preferable to use the same arrangement of coextensive flange, grill edge and gaskets shown in FIG. 4, with the special T-bar ceiling grid support shown in FIG. 5.

Although it is possible to feed the necessary volume of pressurized air from a single main blower unit through individual air conduits to each of the air inlet openings 38 of as many filter assemblies as are installed, the present invention contemplates the further feature of providing a self-contained blower unit mounted on the plenum chamber inlet cover portion of each filter assembly 11 or 11A, as shown in FIG. 3. Thus a blower housing 62 may have supporting flanges 63 and 64 removably secured by screws or bolts 65 to the plenum inlet cover portion 36. Within housing 61 a self-contained blower unit 66 has its outlet connected to the air inlet flange 39 for delivery of pressurized air to the plenum chamber. The blower may receive ambient air through an appropriate opening in the housing 61 which may be covered with a primary filter 67 to assist in removal of unwanted coarser particles.

The individual filter assemblies described herein, when used in a ceiling grid installation, can be removed upwardly (if there is enough working space above the grid) by disengaging screws 50 in either FIG. 4 or 5. They can also be removed downwardly through the special ceiling grid of FIG. 5 by disengaging screws 50 and bolts 52. The used filter block and frame subassembly can then be removed and replaced by a new subassembly having only the preassembled filter and integral plenum chamber elements shown in FIG. 1, whenever a particular filter assembly becomes unduly clogged. The other elements of a complete filter assembly, such as the plenum inlet cover and its cover sealing gasket, and the grill and its peripheral outlet sealing gasket or gaskets, can be saved and reused, as long as they remain in satisfactory condition. The combination of a filter block and integral self-contained plenum chamber and thin-walled support frame pre-sealed to the filter block provides for convenient replacement of such filter units without the critical problems of installing individual filters and clamping and sealing them in connection with a structurally separate, highly pressurized plenum chamber or ceiling space from which undesired impurities could be forced to bypass the filter and contaminate the desired "clean air" work space. By use of such a thin-walled, rigid frame of metallic or other strong material (per unit thickness), the older bulky wooden frames and fixed plenum chambers are eliminated with resulting greater effective filter areas and fire safety.

A plurality of the filter assemblies described herein can also be closely assembled adjacent to each other by bolting their respective side frame supporting flanges to narrow intermediate strips or to each other, without relatively large intermediate supporting frames to reduce the effective usable filter area of an available wall or ceiling opening. Other advantages of the invention will be apparent from the description.

The foregoing specification accordingly sets forth certain preferred embodiments and modifications of the invention and some of the ways in which the invention may be put into practice, including the best mode presently contemplated by the inventors for carrying out this invention. Modifications of the described embodiments, as well as alternate embodiments and devices for carrying out the invention, may also be apparent to those skilled in the art, within the spirit and scope of the following claims:

We claim:

1. A filter assembly for a clean air installation comprising a block of filter material having axially spaced inlet and outlet surfaces and an outer peripheral side surface extending all around the block between the inlet and outlet surfaces, a supporting frame having a side frame portion comprising imperforate, rigid, thin side walls surrounding and closely fitting the peripheral side surface of the filter block, said side frame portion having open inlet and outlet ends defining respective side frame inlet and outlet openings corresponding to the filter block inlet and outlet surfaces, but spaced axially from each other a distance substantially greater than the distance between the inlet and outlet surfaces of the filter block, a layer of adhesive providing an adhesive bond between the outer peripheral side surface of the filter block and the surrounding walls of the side frame portion with the outlet surface of the filter block in essentially the same plane as the side frame outlet opening and with the side frame inlet opening spaced axially upstream from the filter block inlet surface, portions of said side frame walls thereby enclosing the sides and serving as side walls of a plenum chamber volume upstream of the filter block, and the adhesive layer providing an integral seal preventing leakage of air around the filter block from the plenum chamber volume.

2. A filter assembly according to claim 1 having a plenum chamber inlet cover portion extending across and covering the side frame inlet opening and plenum chamber volume, and said cover portion having an air inlet opening therein of smaller cross-section area than the side frame inlet opening for conveying pressurized air into the plenum chamber volume and through the filter block.

3. A filter assembly according to claim 2 having a self-contained blower unit mounted on the inlet cover portion for delivering pressurized air through the air inlet opening to the plenum chamber volume and filter block.

4. A filter assembly according to claim 1 in which the side frame portion has a peripheral supporting flange projecting laterally outwardly around and in substantially the same plane as the filter block outlet surface.

5. A filter assembly according to claim 4 having a perforated outlet grill extending across the entire filter block outlet surface and having an imperforate peripheral edge overlapping at least a portion of the peripheral supporting flange outside the filter block outlet surface.

6. A filter assembly according to claim 5 wherein the peripheral supporting flange and the imperforate peripheral edge of its outlet grill have rectangular peripheral shapes and dimensions so as to be able to extend outwardly around rectangular areas and be supported by longitudinal and lateral extending panel supporting grid bars.

7. A filter assembly according to claim 6 having a rectangular peripheral outlet sealing gasket portion of a size fitting around the outside of the filter block outlet surface area on the downstream side of the imperforate outlet grill edge and peripheral side frame supporting flange so as to be able to seal the space between the filter assembly supporting flange and the supporting bars of standard panel supporting grid.

8. A filter assembly according to claim 7 having a second rectangular peripheral outlet sealing gasket portion of a size fitting all around the outside of the filter block outlet surface area between the peripheral side frame supporting flange and imperforate outlet grill edge so as to be able to further seal the space between the filter assembly supporting flange and the supporting bars of a standard panel supporting grid.

9. A filter assembly according to claim 7 in which the respective areas of the peripheral side frame supporting flange, imperforate outlet grill edge and peripheral outlet sealing gasket portions are essentially coextensive.

10. A filter assembly according to claim 7 in which the peripheral side frame supporting flange and imperforate outlet grill edge have preformed aligned axial openings for receiving the ends of clamping fasteners adapted to extend through standard panel-supporting grid bars and peripheral side frame supporting flange and clamp the imperforate edge of the outlet grill and the sealing gasket therebetween.

11. A filter assembly according to claim 7 in which the supporting frame has a peripheral cover flange projecting laterally outwardly from the side frame portion in substantially the same plane as the side frame inlet opening, said assembly also having a plenum chamber inlet cover member extending across and covering the side frame inlet opening, plenum chamber volume and cover flange, a cover edge gasket portion between the cover member and cover flange, cover fastening means removably securing said inlet cover and cover edge gasket in air-tight relation to said peripheral cover flange, and said inlet cover member having an air inlet opening therein of substantially smaller cross-section area than the side frame inlet opening for delivering pressurized air through the air inlet, into the plenum chamber volume and through the filter block.

12. A filter assembly according to claim 11 in which the filter block consists of a high efficiency particulate air (HEPA) filter material.

* * * * *